April 29, 1969     L. H. BUSKER ET AL     3,441,844
MICROWAVE MOISTURE SENSING SYSTEM
Filed June 16, 1965
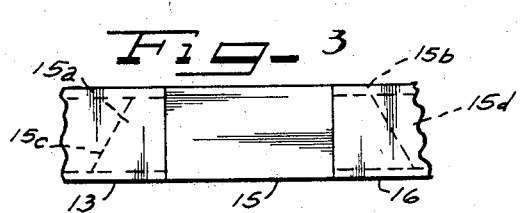
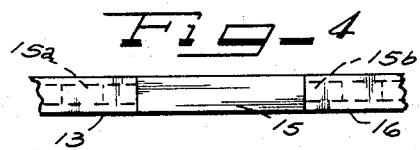
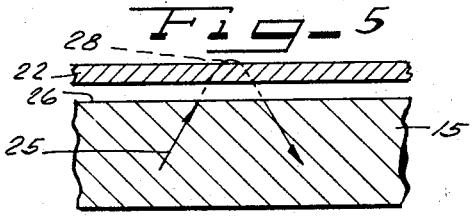
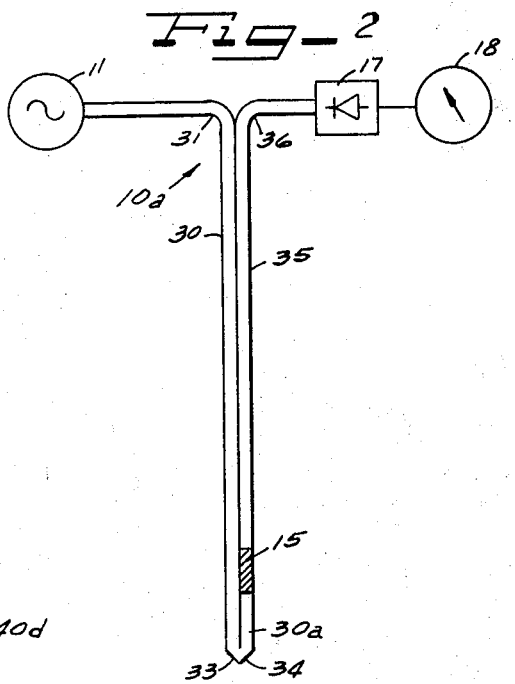
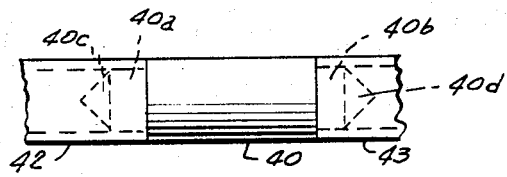
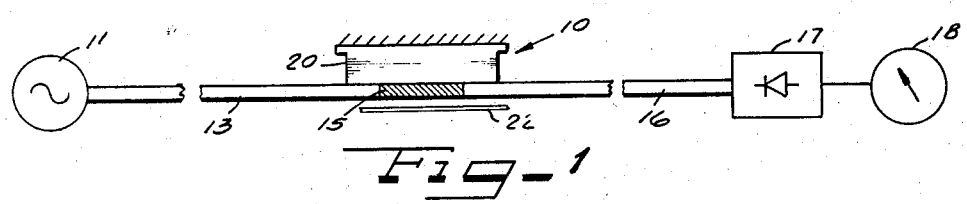
INVENTORS
LEROY H. BUSKER
WESLEY E. GRENLUND
BY ATTORNEYS

United States Patent Office

3,441,844
Patented Apr. 29, 1969

1

3,441,844
MICROWAVE MOISTURE SENSING SYSTEM
Leroy H. Busker, Rockton, Ill., and Wesley E. Grenlund, Clinton, Wis., assignors to Beloit Corporation, Beloit, Wis., a corporation of Wisconsin
Filed June 16, 1965, Ser. No. 464,398
Int. Cl. G01h 27/04
U.S. Cl. 324—58.5    2 Claims

ABSTRACT OF THE DISCLOSURE

Apparatus and method for measuring characteristics of a sample such as moisture content with a microwave generator connected to a first wave guide and a microwave indicator connected to a second wave guide and with a section joining the first and second wave guides which has a higher dielectric constant than the sample so that energy passing through the section will pass through the sample to be attenuated.

---

This invention relates generally to a system for and method of detecting the quantity of a given constituent in a particular material, and specifically to an instrument including a microwave wave guide having a portion thereof constructed of a dielectric material for emitting microwave energy from the wave guide to the area adjacent the dielectric material.

It has been thought by those skilled in the art that microwave energy is totally reflected at a boundary surface between two dielectric mediums providing the incident wave is in the medium having the higher dielectric constant and that the angle of incidence exceeds the angle of total internal reflection. However, it has been shown in a publication by Wiley of a book written by Arthur R. Von Hippel, entitled Dielectrics and Waves, p. 55, that the electric field is not reflected precisely at the interface of the two dielectric mediums, but rather extends into the second medium and is exponentially curved so that it returns and re-enters the first medium. This resulting phenomenon of the electric field extension from the boundary surface of a dielectric serves as a very useful means for surface wave detection of a constituent of a material. One particular application of the present invention is that of sensing and determining moisture or water molecule content in a traveling paper web.

The application of microwave energy for determining the quantity of a constituent is based on the fact that the molecular structure of a given constituent is such that at a given frequency of microwave range, the molecule will absorb some of the microwave energy. Therefore, as the number of molecules increases, the amount of microwave energy which is absorbed also increases, thereby giving a quantitative analysis of the particular constituent.

It is, therefore, an object of the present invention to provide a novel and improved method and means for determining the amount of a constituent, such as moisture, associated with a particular solid or fluid material.

Another object of the present invention is to provide an instrument for measuring moisture content and the like having a novel and improved sensing element.

Still another object of the present invention is to provide a surface wave device having a sensing element which effectively couples microwave energy to a material under test.

2

A further object of the present invention is to provide a microwave sensing element of dielectric material which also serves as a wave guide.

Still another object of the present invention is to provide a microwave wave guide which has a portion thereof substantially of dielectric material such that microwave energy will be propagated therethrough.

SUMMARY OF THE INVENTION

It is often desirable to measure characteristics of materials such as moisture content in a sample. The present invention comprises a microwave generator with a first wave guide section connected to it and an indicator and receiver with a second wave guide section connected to it. A wave guide energy emitting and receiving portion is mounted between the first and second wave guide sections and is placed adjacent the sample. The emitting and receiving portion is made of material which has a higher dielectric constant than the sample so that a portion of the energy will leave it, pass through the sample and return to emitting and receiving portion after being attenuated. The amount of attenuation will be detected by the indicator and receiver and is indicative of the moisture content of the sample. The wave guide section and the emitting and receiving portion may be formed into a probe, if desired.

These and other objects of the present invention will become more fully realized and understood from the following detailed description when taken in conjunction with the accompanying drawings wherein like reference numerals are intended to designate the same or similar structure and wherein:

FIGURE 1 is a diagrammatic view of the constituent sensing system of the present invention;

FIGURE 2 is a diagrammatic view of the constituent sensing system of the present invention wherein the wave guide is utilized as a probe;

FIGURE 3 is a detailed top view of a dielectric sensing element inserted into the wave guide of the constituent sensing systems of FIGURES 1 and 2;

FIGURE 4 is a detailed front view of the dielectric sensing element of FIGURE 3;

FIGURE 5 is a somewhat diagrammatic view showing the propagation of microwave energy through the dielectric sensing element used in the sensing systems of FIGURES 1 and 2; and FIGURE 6 is a cylindrically shaped dielectric sensing element which has the ends thereof secured to a cylindrical wave guide which can be used in the constituent sensing systems of FIGURES 1 and 2.

The sensing system shown in FIGURE 1 is designated by reference numeral 10, and has a microwave frequency generating source 11, which is preferably a klystron of well known design. The microwave energy from the klystron 11 is delivered to a wave guide 13 wherein the microwave energy is propagated to a dielectric wave guide sensing element 15. A substantial amount of the microwave energy delivered to the sensing element 15 will be propagated therethrough and enter a wave guide 16. The microwave energy which has been delivered to the wave guide 16 is detected by detector 17 and an indication of the level of microwave power is given by an indicator 18. A supporting or backing member 20 may be provided between the wave guides 13 and 16 to support the wave guides in the region of the sensing element 15, thereby eliminating the need of dielectric sensing elements having great physical strength properties. A material indicated by reference numeral 22 may be placed adjacent to the sensing element 15 for absorbing microwave energy therefrom in proportion to the quantity of a constituent of the material.

As one example of operation, the klystron 11 delivers microwave energy at a frequency range between 21,500 megacycles and 22,750 megacycles, thereby operating within the microwave absorption frequency of the water molecule. However, it is to be understood that the frequency of operation need not be limited to such a range and any microwave frequency is workable. For instance, frequencies of 10,000 and 182,000 megacycles have been employed. The microwave energy is propagated to the detector 17 by means of the wave guides 13 and 16 and the sensing element 15. Although microwave energy losses may be encountered during the propagation of the microwave energy, these losses are substantially constant when no material is placed adjacent to the sensing element 15. Therefore, for a given sensing system the microwave energy which is recorded by the indicator 18, when no material is adjacent the sensing element 15, can represent a zero quantity of water molecules. But, when the material 22 is placed adjacent the sensing element 15, a predetermined quantity of microwave energy may be absorbed by the material 22 in proportion to the quantity of water molecules associated therewith. Therefore, the microwave energy which is recorded by the indicator 18 will be decreased by an amount proportional to the microwave energy absorbed by the water molecule. This action will give a direct and accurate indication of the water molecules associated with the material 22.

As mentioned hereinabove, the microwave energy which is propagated through the sensing element 15 is not reflected precisely at the interface of the two dielectric mediums, but rather extends into the second medium and is exponentially curved back into the first medium. This can be best illustrated by reference to FIGURE 5. A beam 25 of microwave energy will impinge on the interface 26 of the dielectric 15 and pass through the interface 26 as shown. It is to be realized that energy passes through the sensing element 15, a portion of the energy leaves the sensing element 15, passes through the sample and returns to the sensing element 15 and passes on into wave guide 16 to detector 17 and indicator 18. Numeral 25 represents that portion of the microwave energy which leaves the sensing element 15 and returns to it after being attenuated by the sample. The beam 25 is then exponentially curved as shown at 28 so that it will reenter the dielectric 15 at substantially the same angle of incidence. When the microwave energy of the beam 25 has penetrated the interface of the dielectric material 15, the microwave energy comes in full contact with the material 22. The water molecules within the material 22 will then absorb microwave energy in proportion to the quantity of water molecules and, therefore, the microwave energy which is returned into the dielectric 15 is that quantity which has penetrated the interface minus the microwave energy absorbed by the water molecules. When the microwave energy is then delivered to the wave guide 16, of FIGURE 1, the diminished microwave energy is indicated by the indicator 18.

Shown in FIGURE 2 is an alternate embodiment of the present invention which can be utilized as a probe and is designated by reference numeral 10a. The klystron 11 is connected to a wave guide 30 which has a bend 31 of sufficient radius to cause the microwave energy within the wave guide to change direction without any substantial loss of energy. The wave guide 30 is provided with a pair of reflective surfaces 33 and 34 which may be E or H plane corners which cause the microwave energy within the wave guide to be reflected to change the direction of propagation by approximately 180°. This change in direction will cause microwave energy to be propagated through the wave guide section 30a enroute to the sensing element 15. The microwave energy passes through the sensing element 15 and is delivered to a wave guide 35 which has a bend 36. The end of the wave guide 35 is connected to the detector 17, and the detector 17 is connected to the indicator 18.

The operation of the constituent sensing system 10a is substantially the same as the constituent sensing system 10 of FIGURE 1. However, the system 10a may have greater inherent losses due to the bends 31 and 36 and the reflective surfaces 33 and 34. These losses are substantially constant and do not affect the operation of the system.

The sensing element 15 preferably has the same cross sectional dimensions as the wave guides 13 and 16 as shown in FIGURES 3 and 4. The sensing element 15 is provided with reduced end portions 15a and 15b which conform to the inside dimensions of the wave guides 13 and 16 respectively. The sensing element 15 may be matched to the wave guides 13, 16 by any number of means familiar to those skilled in the art. In the illustrated embodiment, the end portions 15a and 15b have inclined surfaces 15c and 15d which preferably are perpendicular to the propagation of microwave energy within the wave guide, thereby minimizing the effect of a refracted wave within the sensing element 15.

It may be noted that either the broad walls or the narrow walls of the wave guides 30, 35 can be juxtaposed to one another when a rectangular cross section wave guide is employed. By such juxtaposed relationship between the guides 30, 35 and the bends provided therein, a long and relatively narrow probe is provided.

Shown in FIGURE 6 is a cylindrical sensing element 40 which has reduced end portions 40a and 40b. The diameter of the end portions 40a and 40b are preferably conformed to the inside diameter of a pair of wave guides 42 and 43 connected thereto. The end portions 40a and 40b have tapered ends 40c and 40d which are preferably perpendicular to the propagation of microwave energy within the wave guide.

In all of the illustrated embodiments of the present invention, at least three sides of the sensing element 15 have been shown as being open for presenting an interface to a material under inspection. For instance, as shown in FIGURE 1, one side of the sensing element 15 is covered by the supporting member 20 and in FIGURE 2, one side is closed by the wave guide 30. On the other hand, FIGURES 3, 4, 5 and 6 illustrate the sensing element open on all sides. If desired, more than one side of the sensing element 15 can be covered so that only one or two sides, as preferred, may be open for presenting an interface to the material under inspection. Similarly the sensing element of FIGURE 6 may also be covered over a portion of the external surface thereof so as to present only the remaining open portion to the surrounding environment and to the material under inspection.

We claim:
1. Apparatus for sensing a constituent of a moving paper web comprising:
  (a) a microwave energy source,
  (b) receiving means including a detector and an indicator,
  (c) first wave guide low loss means having one end thereof connected to said microwave energy source,
  (d) second wave guide low loss means having one end thereof connected to said receiving means,
  (e) the first and second wave guide means spaced apart less than the width of said paper web, and
  (f) a dielectric wave guide sensing element section connected between the spaced ends of said first and said second wave guide for subjecting the microwave energy to the moving paper web whereby the fringing field enters the paper web and is attenuated thereby so that the detector and indicator sense the constituent properties.

2. Apparatus according to claim 1 wherein the first wave guide low loss means is formed with a substantially 180 degree bend so that a probe is formed.

References Cited

UNITED STATES PATENTS

| | | | |
|---|---|---|---|
| 2,794,959 | 6/1957 | Fox | 324—58 X |
| 3,079,551 | 2/1963 | Walker | 324—58 X |
| 3,136,946 | 6/1964 | Le Vine | 324—58.5 |

OTHER REFERENCES

Montgomery: Radiation Lab. Series, vol. 11, pp. 667–670, McGraw-Hill, New York (1947).

RUDOLPH V. ROLINEC, *Primary Examiner.*

P. F. WILLE, *Assistant Examiner.*